US012560137B2

(12) United States Patent
Mathes et al.

(10) Patent No.: US 12,560,137 B2
(45) Date of Patent: Feb. 24, 2026

(54) FUEL VAPOR CANISTER

(71) Applicant: MAHLE International GmbH, Stuttgart (DE)

(72) Inventors: Eric Mathes, Shelby Township, MI (US); Antonio Spadafora, Tecumseh (CA)

(73) Assignee: Mahle International GmbH (DE)

( * ) Notice: Subject to any disclaimer, the term of this patent is extended or adjusted under 35 U.S.C. 154(b) by 0 days.

(21) Appl. No.: 18/417,704

(22) Filed: Jan. 19, 2024

(65) Prior Publication Data

US 2024/0247624 A1 Jul. 25, 2024

Related U.S. Application Data

(60) Provisional application No. 63/440,367, filed on Jan. 20, 2023.

(51) Int. Cl.
*F02M 25/08* (2006.01)

(52) U.S. Cl.
CPC .... *F02M 25/0836* (2013.01); *F02M 25/0854* (2013.01); *F02M 25/089* (2013.01)

(58) Field of Classification Search
CPC ............. F02M 25/0836; F02M 25/854; F02M 25/089; F02M 2025/0863; F02M 33/02; B01D 15/03504; B01D 2015/0863; B01D 2259/4516
See application file for complete search history.

(56) References Cited

U.S. PATENT DOCUMENTS

| | | | | | |
|---|---|---|---|---|---|
| 4,655,189 | A * | 4/1987 | Koga | F02M 25/0854 | 96/136 |
| 5,304,235 | A * | 4/1994 | Watanabe | F02M 25/0854 | 96/147 |
| 5,641,344 | A * | 6/1997 | Takahashi | F02M 25/0854 | 96/147 |
| 2002/0026874 | A1* | 3/2002 | Ikuma | F02M 25/0854 | 96/144 |
| 2003/0168099 | A1* | 9/2003 | Matsushima | F02M 25/0854 | 137/269 |
| 2004/0206240 | A1* | 10/2004 | Oh | B01D 45/12 | 96/135 |

(Continued)

FOREIGN PATENT DOCUMENTS

| | | | | |
|---|---|---|---|---|
| FR | 3084599 | A1 * | 2/2020 | B60K 15/03504 |
| JP | 58013149 | A * | 1/1983 | |

*Primary Examiner* — John M Zaleskas
(74) *Attorney, Agent, or Firm* — Fishman Stewart PLLC

(57) ABSTRACT

An evaporative emission control system (EVAP) canister including a housing, where the housing has a first bed volume, a second bed volume, a load port, and a purge control receptacle. The first bed volume includes a first opening and a second opening opposite the first opening. The second bed volume includes a third opening and a fourth opening opposite the third opening. The load port enables fuel vapor from a fuel tank to enter the first bed volume. The purge control receptacle is on a side of the first bed volume and is configured to receive a first purge control insert. The first purge control insert is configured to ensure that unfiltered fuel vapor condensate drawn in during a purge cycle is passed through a first portion of a fuel vapor filtering medium in the first bed volume.

20 Claims, 8 Drawing Sheets

(56) References Cited

U.S. PATENT DOCUMENTS

| | | | | |
|---|---|---|---|---|
| 2005/0109327 | A1* | 5/2005 | Reddy | F02M 25/0836<br>123/519 |
| 2008/0110440 | A1* | 5/2008 | Oh | F02M 25/0854<br>96/147 |
| 2009/0320806 | A1* | 12/2009 | Lang | H04L 27/361<br>123/549 |
| 2011/0247592 | A1* | 10/2011 | Kim | F02M 25/0854<br>123/519 |
| 2012/0234301 | A1* | 9/2012 | Takamatsu | F02M 25/0854<br>123/519 |
| 2014/0041522 | A1* | 2/2014 | Yoshida | B01D 53/04<br>96/122 |
| 2015/0007799 | A1* | 1/2015 | Takeshita | F02M 25/0854<br>123/519 |
| 2015/0316008 | A1* | 11/2015 | Catton | F02M 25/0854<br>96/152 |
| 2016/0296876 | A1* | 10/2016 | Kim | F02M 25/0854 |
| 2021/0016219 | A1* | 1/2021 | Kosugi | B01D 53/0407 |

* cited by examiner

FUEL VAPOR CANISTER

CROSS-REFERENCE TO RELATED APPLICATION

This application claims priority to U.S. Provisional Application No. 63/440,367, filed on Jan. 20, 2023, the contents of which is hereby incorporated by reference in its entirety.

TECHNICAL FIELD

The present disclosure generally relates to a fuel vapor emission system and its accompanying fuel vapor canister for the treatment of fuel vapor associated with an internal combustion engine.

BACKGROUND

An Evaporative Emission Control System (EVAP) may be coupled to an internal combustion engine to prevent fuel vapors (e.g., gasoline vapors) from escaping from a fuel tank and fuel system into the atmosphere.

A common EVAP system includes a carbon canister (a.k.a. fuel vapor canister or fuel canister) that uses one or more types of activated carbon to capture fuel vapor through adsorption. When an internal combustion engine is not running, fuel vapor from the fuel tank may be passed through activated carbon of the carbon canister so that the fuel vapor is adsorbed therein. That is, air mixed with fuel vapor moves from the fuel tank to the carbon canister via a load port to ensure fuel vapor is not released to the atmosphere. After the fuel vapor/air mixture enters the carbon canister via the load port, activated carbon in the carbon canister adsorbs the fuel vapor in the mixture and clean air (or generally clean air) leaves the carbon canister and is generally allowed to escape to the environment.

There may be, however, practical limits as to how much fuel vapor that can be adsorbed by the activated carbon. As such, when the engine is running, the EVAP system directs "clean" air through the activated carbon to purge the fuel vapor from the carbon (a.k.a. desorption). The purged fuel vapor is then generally passed, via a purge port, to an air intake manifold of the engine where it is used to augment combustion.

To reiterate, when an engine is not running, the EVAP generally directs fuel vapor into a carbon canister via a load port so that the activated carbon in the canister may adsorb the fuel vapor. When the engine is running, one or more purge cycles occur, causing the fuel vapor to be desorbed from the fuel canister and conveyed via a purge port into an engine air intake manifold to augment combustion. The desorption that occurs during the purge cycle ensures that the fuel vapor filtering medium (e.g., activated carbon) does not become saturated such that it no longer captures fuel vapor when needed.

A common carbon canister may include one or more chambers (a.k.a. bed volumes) fluidly coupled together, where each chamber is generally filled with some type of activated carbon. Often, each chamber is longer than it is wide. Further, one or more chambers may include a spring employed to apply pressure to the activated carbon in the respective chamber. These springs are generally positioned such that the force applied by the springs is in the direction along the length of each of the respective chamber. Among other things, the springs may ensure a generally tight pack of the activated carbon.

A load port and a purge port are often located protruding from one end of the chamber(s) that is opposite the spring end. This configuration often helps to ensure that any condensed fuel vapor (i.e., liquid fuel) drawn in during a purge cycle is not conveyed to an air intake manifold of an engine. However, due to the size of such configurations, it can be challenging to find space to accommodate these types of carbon canisters. That is, devices that use these common carbon canisters, such as vehicles or generators, often have size constraints that make finding space to accommodate a carbon canister difficult.

Accordingly, there is a need for carbon canisters that accommodate the space requirements often encountered when designing devices that employ an internal combustion engine.

DETAILED DESCRIPTION

Referring to the discussion that follows and the Figures, illustrative approaches to the disclosed systems and methods are described in detail. Although the Figures represent some possible approaches, the Figures are not necessarily to scale and certain features may be exaggerated, removed, or partially sectioned to better illustrate and explain the present disclosure. Further, the descriptions set forth herein are not intended to be exhaustive, otherwise limit, or restrict the claims to the precise forms and configurations shown in the Figures and disclosed in the following detailed description.

Figure 1A:
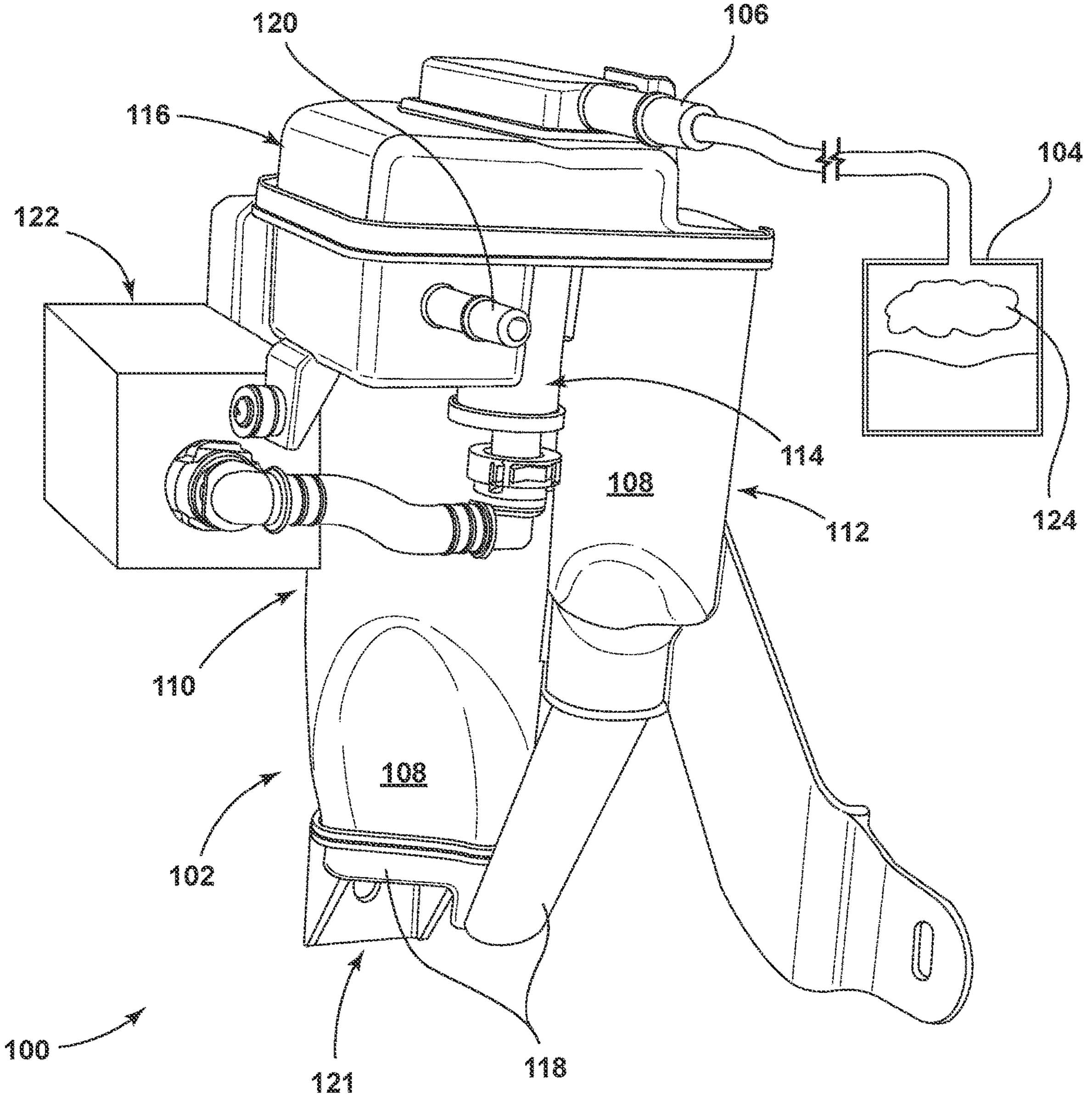
FIG. 1A illustrates a three-dimensional perspective view of an exemplary fuel canister of an EVAP.

With reference now to FIG. 1A, portions of an exemplary evaporative emission control system (EVAP) 100 are shown. The exemplary EVAP 100 (shown from a three-dimensional perspective) includes a canister 102 that filters fuel vapor from a tank 104 (shown in cross section).

The canister includes, in part, a load port 106 where fuel vapor from the tank 104 enters the canister 102, a housing 108 having three bed volumes 110, 112, 114, a cap 116 covering openings of the three bed volumes 110-114, a coupling 118 (a.k.a. pass-through connector) that fluidly couples the first bed volume 110 to the second bed volume 112, and a purge port 120 where fuel vapor is expelled during a purge cycle. The coupling 118 may include a mounting portion 121 to at least partially secure, and in some approaches fully secure, the fuel canister 102 within a vehicle (not shown) or engine compartment.

The EVAP 100 may also include a canister vent solenoid valve (CVS) and filter 122 coupled to the canister 102. In other examples, however, the CVS 122 could instead be a leak detection valve, an evaporative system integrity module (ESIM), a fuel tank isolation valve (FTIV), or an electronic leak check module (ELCM).

Though not shown in FIG. 1A, but as will be described below with respect to FIGS. 1B-1D and FIGS. 2-5, the three bed volumes 110-114 of the canister 102 include a fuel vapor filtering medium. The type of fuel vapor filtering medium used in each bed volume 110-114 need not be the same. In other words, one, two, three, or more types of fuel vapor filtering mediums may be employed. As such, in one example, each bed volume 110-114 may be filled (or partially filled) with a different type of fuel vapor filtering media. The fuel vapor filtering medium may include, for example, activated carbon which is known for temporarily adsorbing fuel vapor.

In one example, the first and second bed volumes 110, 112 may include pelletized carbon adsorbents with a butane working capacity (BWC) typically greater than 8 g/dL. Further, the third bed volume 114 may include extruded particle carbon (a.k.a. MPAC 1), as described in U.S. Pat. No. 9,174,195, which is incorporated herein by reference in its entirety. The particle arrangement of MPAC 1 is advantageous for space-constrained applications since the particle allows for the third bed volume 114 to be of various shapes and does not require the continuous length that is often needed for a honeycomb monolith typically longer than 100 mm.

While the exemplary EVAP 100 of FIG. 1A illustrates three bed volumes 110-114, other examples may instead include one, two, or more than three bed volumes.

As pressure increases in the fuel tank 104, a mixture 124 of air and fuel vapor from the tank 104 may enter through the load port 106 so that it may be conveyed through the fuel vapor filtering medium in the first, second, and third bed volumes 110-114. As such, the fuel vapor in the mixture 124 is adsorbed by the fuel vapor filtering medium(s) in each bed volume 110-114 and clean air is expelled via the CVS 122. This cycle, that includes the flow of the mixture 124 into the load port 106 and through the fuel vapor filtering medium(s), may be referred to as a flow or load cycle.

When an engine (not shown) is operating, a purge cycle may be employed to "clean" the fuel vapor filtering media. During an exemplary purge cycle, air from the environment is drawn through, for example, the CVS 122 and passed through the third bed volume 114, the second bed volume 112, the coupler 118, and then through the first bed volume 110 before exiting the purge port 120. The air passed through the canister 102 during the purge cycle causes fuel vapor that was previously adsorbed by the fuel vapor filtering medium during the load cycle to be resorbed into air passing therethrough. The resorbed fuel vapor that passes out the purge port 122 may be directed to an engine air intake manifold (not shown) where it can be used to augment combustions.

Having the purge port 122 and the load port 106 protrude from the side of the canister 102 allows for a more compact design of the canister 102, making it easier for those that design engines to find space to accommodate the canister 102.

As will be described below with respect to FIGS. 1B-1D and FIGS. 2-5, examples presented herein illustrate how the risk that any residual fuel vapor condensed (i.e., liquid fuel) in the cap 116 (or load port 106) may be passed to an air intake manifold of an engine can be minimized.

Figure 1B:
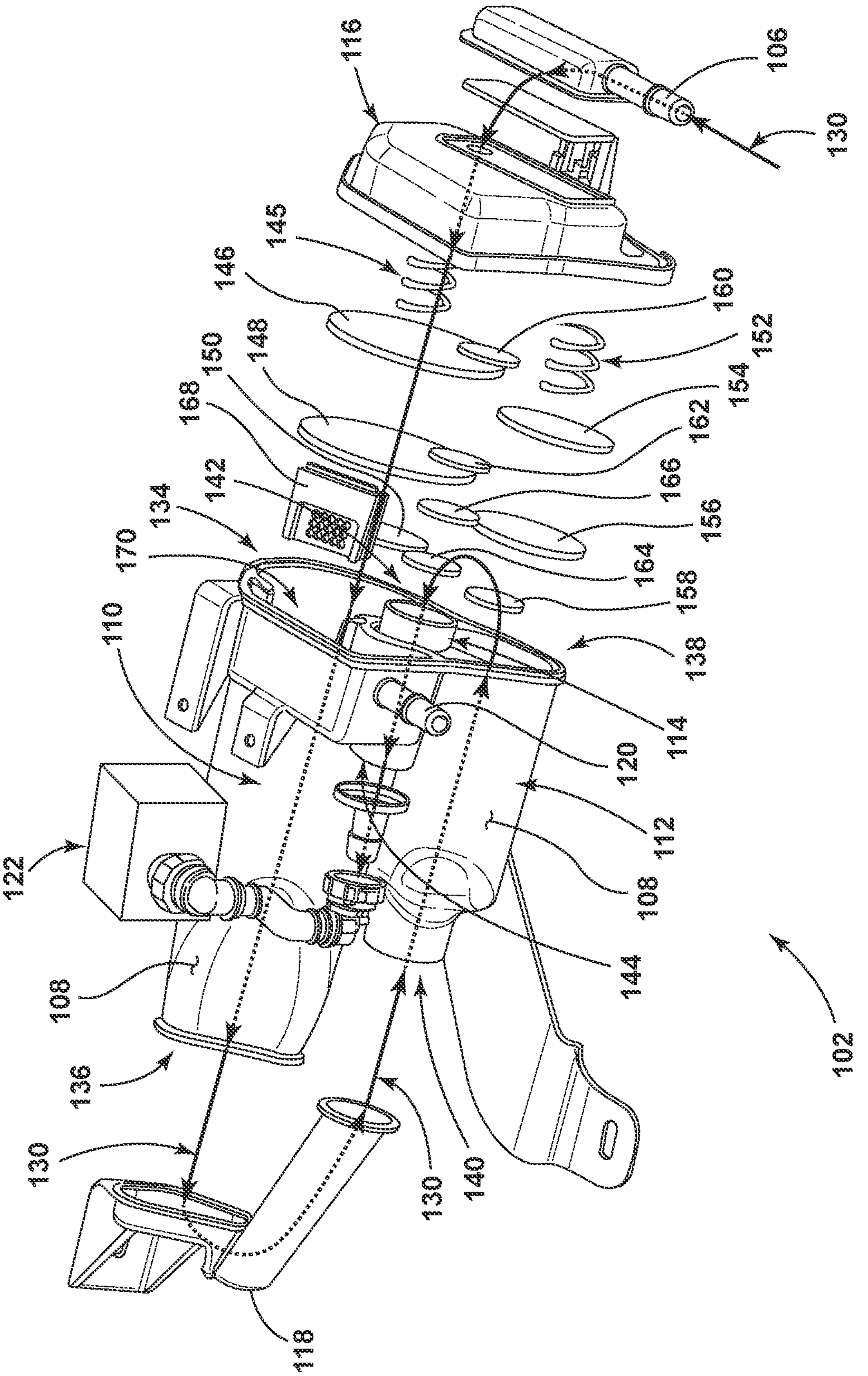
FIG. 1B illustrates an exemplary load cycle through the exemplary fuel canister of FIG. 1A shown in an exemplary three-dimensional exploded view.
Figure 1C:
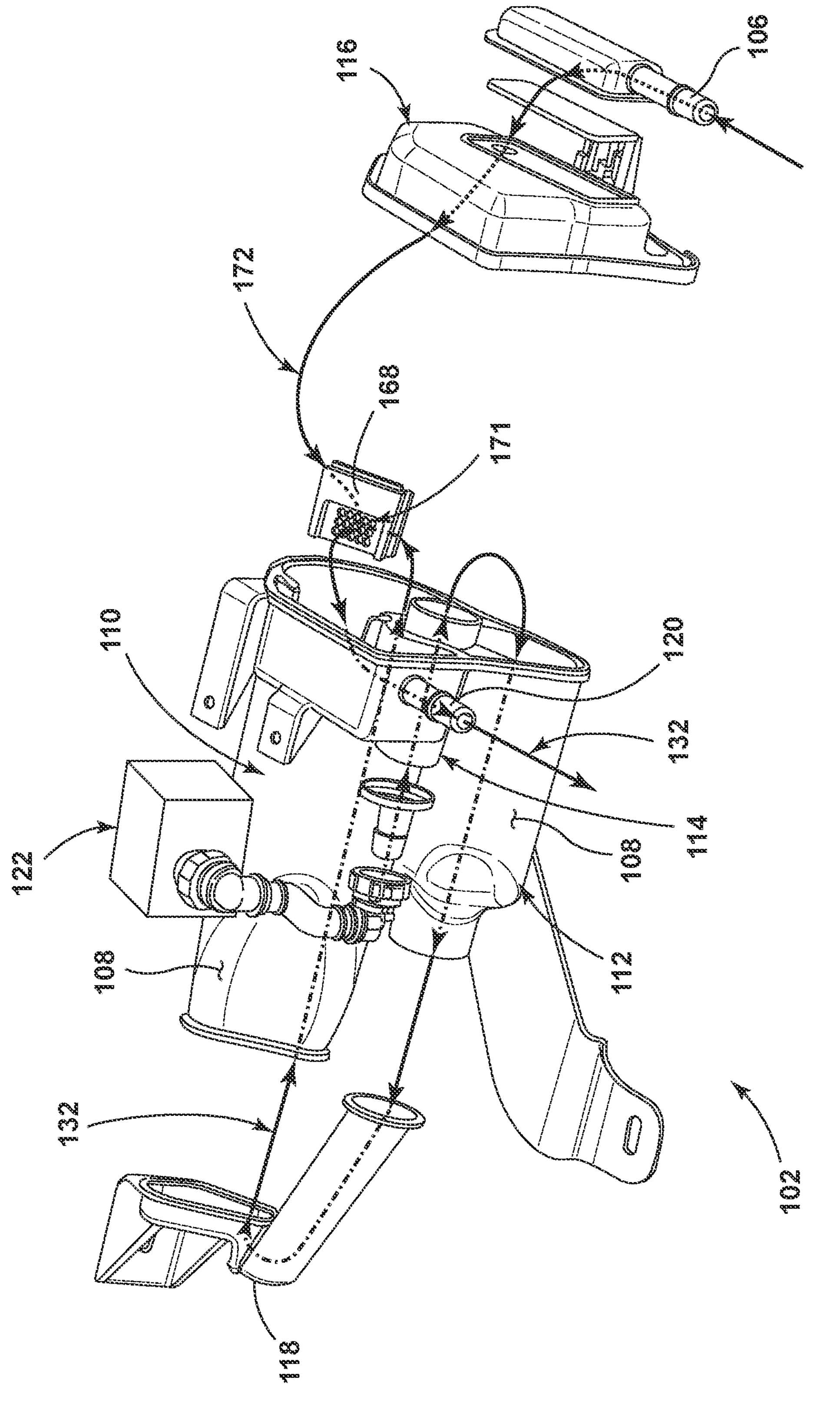
FIG. 1C illustrates an exemplary purge cycle through the exemplary fuel canister of FIG. 1A shown in another exemplary three-dimensional exploded view.

With reference now to FIGS. 1B and 1C, the exemplary canister 102 of FIG. 1A is shown in an exploded perspective view. While FIG. 1B shows an exemplary load cycle 130, FIG. 1C shows an exemplary purge cycle 132.

Referring now to FIG. 1B, the housing 108 of the exemplary canister 102 is shown having the three bed volumes therein. The first bed volume 110 includes a first opening 134 and a second opening 136 that is opposite the first opening 134. The second bed volume 112 includes a third opening 138 and a fourth opening 140 opposite the third opening 138. Lastly, the third bed volume 114 includes a fifth opening 142 and a sixth opening 144 opposite the fifth opening 142. Other exemplary canisters not shown may include only one, two, or more than three bed volumes.

The exemplary canister 102 further includes a first spring 145, a first end plate 146 (which is permeable to fuel vapor), a first filtering insert 148, and a second filtering insert 150. When assembled (see, e.g., FIG. 1A), the first spring 144 of FIG. 1B applies a force that is transmitted through the first end plate 146, the first filtering insert 148, and through a fuel vapor filtering medium (not shown) in the first bed volume 110 to the second filtering insert 150, which is positioned towards the second opening 136 of the first bed volume 110. This force helps to keep the fuel vapor filtering medium contained in the first bed volume 110 and also helps to minimize voids in the fuel vapor filtering medium.

Similarly, the canister 102 also includes a second spring 152 that applies a force through a second end plate 154 (also permeable to fuel vapor), a third filtering insert 156, through a fuel vapor filtering medium (not shown) in the second bed volume 112 to a fourth filtering insert 158, which is positioned towards the fourth opening 140 of the second bed volume 112. This force helps to keep the fuel vapor filtering medium contained in the second bed volume 112 and minimizes voids in the filtering medium.

Further details regarding the configuration of the springs 145, 152, end plates 146, 154, filtering inserts 148, 150, 156, 158, and fuel vapor filtering mediums will be described below with respect to FIG. 3.

With continued reference to FIG. 1B, the cannister 102 may also include a fifth end plate 160 (permeable to fuel vapor), a fifth filtering insert 162 positioned towards the fifth opening 142 of the third bed volume 114, a sixth filtering insert 164 by the sixth opening 144 of the third bed volume 114, and a seventh filtering insert 166 centrally located between the fifth opening 142 and the sixth opening 144 of the third bed volume 114.

The filtering inserts employed may include, for example, foam, fleece, and/or other filtering materials permeable to fuel vapor, but impermeable to other unwanted elements. Further, the filtering elements represented in FIG. 1B are merely exemplary, since more or less than those shown may be employed.

Also shown in FIG. 1B is a purge control insert 168 that fits within a purge control receptacle 170, each of which will be discussed in greater detail below with respect to FIG. 1D and FIGS. 2-5.

With continued reference to FIG. 1B, the load cycle 130 illustrates the flow of the air/fuel vapor mixture 124 (FIG. 1A) from the tank (also FIG. 1A) as it moves through the canister 102.

As shown in FIG. 1B, during the load cycle 130 the air/fuel vapor mixture enters the load port 106 and proceeds through the canister 102 by passing through the first end cap 146, the first filtering insert 148, the first bed volume 110, the second filtering insert 150, the coupling 118, the fourth filtering insert 158, the second bed volume 112, the third filtering insert 156, the fifth filtering insert 160, and the sixth filtering insert 164 as is passes through the third bed volume 114. The fuel vapor filtering medium (not shown) in each of the first, second, and third bed volumes 110-114 adsorbs the fuel vapor in the mixture 124. As such, clean air leaves the sixth opening 144 of the third bed volume 114 and is passed through the CVS 122 to the environment.

Referring now to FIG. 1C, the flow of the purge cycle 132 is shown. For clarity, the springs 145, 152, end plates 146, 156, and filtering elements 148, 150, 158-166 of FIG. 1B are not shown.

With continued reference to FIG. 1C, the purge cycle 132 is initiated when the CVS 122 allows a vacuum from the engine (not shown) to draw air from the environment to clean the canister 102. During the purge cycle 132, the environmental air is drawn through the CVS 122 and passed through the third bed volume 114, the second bed volume 112, the coupler 118, the first bed volume 110, the windows 171 of the purge control insert 168, and then out through the purge port 120. As the air passes through each bed volume 114, 112, 110 and its associated filtering medium (not shown), the fuel vapor is desorbed from the respective fuel filtering medium and generally passes along with the purge air 132 out the purge port 120.

Though not shown, the air/fuel vapor mixture leaving the purge port 120 can be fed into an engine where it may be used to augment combustion.

Due to the dynamics of the flow during the purge cycle 132, fuel vapor that has condensed in the cap 116 or load port 106 may be drawn 172 into the first bed volume 110. However, since the window(s) 171 of the purge control insert 168 are embedded within the fuel filtering medium, the risk of liquid fuel being conveyed out the load port 120 is minimized. Details regarding how the windows 171 of the purge control insert 168 are embedded within the fuel filtering medium are described below with respect to FIGS. 1D-5.

Figure 1D:
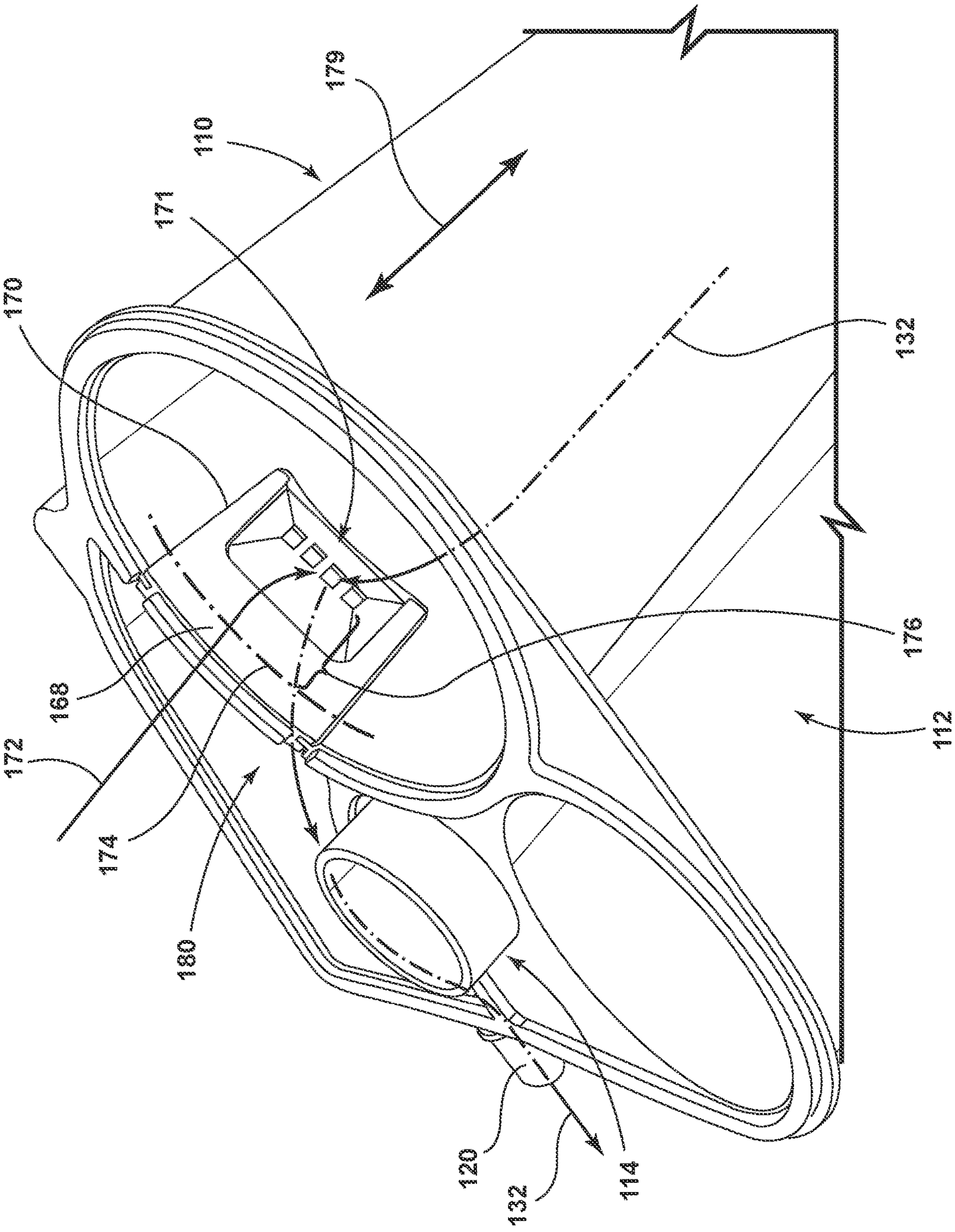
FIG. 1D illustrates a three-dimensional perspective view of a portion of the exemplary fuel canister of FIG. 1A.

Referring now to FIG. 1D, an exemplary partial perspective view of the canister housing 108 of FIGS. 1A-1C is shown. A portion of the first, second, and third bed volumes 110, 112, 114, respectively, of the housing 108 are illustrated. For illustrative purposes, an exemplary fill line 174 is shown on the interior of the first bed volume 110 and the purge control insert 168. Manufactured examples of the housing 108 and insert 168 need not include the fill line 174.

The exemplary fill line 174 of FIG. 1D represents an exemplary level to which the fuel vapor filtering medium would reach. Do to the nature of the purge control insert 168, any slug of liquid fuel in the cap (e.g., fuel vapor that has condensed to a liquid in the cap 166 of FIGS. 1A-1C) will travel through a minimum volume 176 (a.k.a. buffer volume) of fuel vapor filtering medium. As such, the purge control insert 168 ensures that the liquid fuel is not conveyed out the purge port 120. If a bit of liquid fuel does pass through the windows 171 of the purge control insert 168, a reservoir 180 captures the liquid fuel and ensures it does not pass out the purge port 120.

In one example, the purge windows 171 sum an area of 64 $mm^2$, the purge port 120 has a cross-sectional area of 34.63 $mm^2$, and the buffer volume 176 is about 100 cc. The location of the purge control receptacle 170 and the accompanying insert 168 may vary along the length of the first bed volume 110, as indicated by an arrow 179 along the housing 108.

Further, the dimensions and shape of the purge receptacle 170 and the corresponding purge control insert 168 may also vary based on needs. For example, the dimensions of the purge control insert 168 and the associated receptacle 170 may be changed to lower the purge control window(s) 171 deeper into the first bed volume or to raise the purge control window(s) 171 higher in the first bed volume.

By changing the position of the purge window(s) 171, the amount (e.g., the buffer volume 176) of filtering medium that condensed fuel vapor passes through may be changed. To illustrate, see FIG. 2, where three exemplary first, second, and third purge control inserts 200, 202, 204 are respectively represented.

Figure 2:
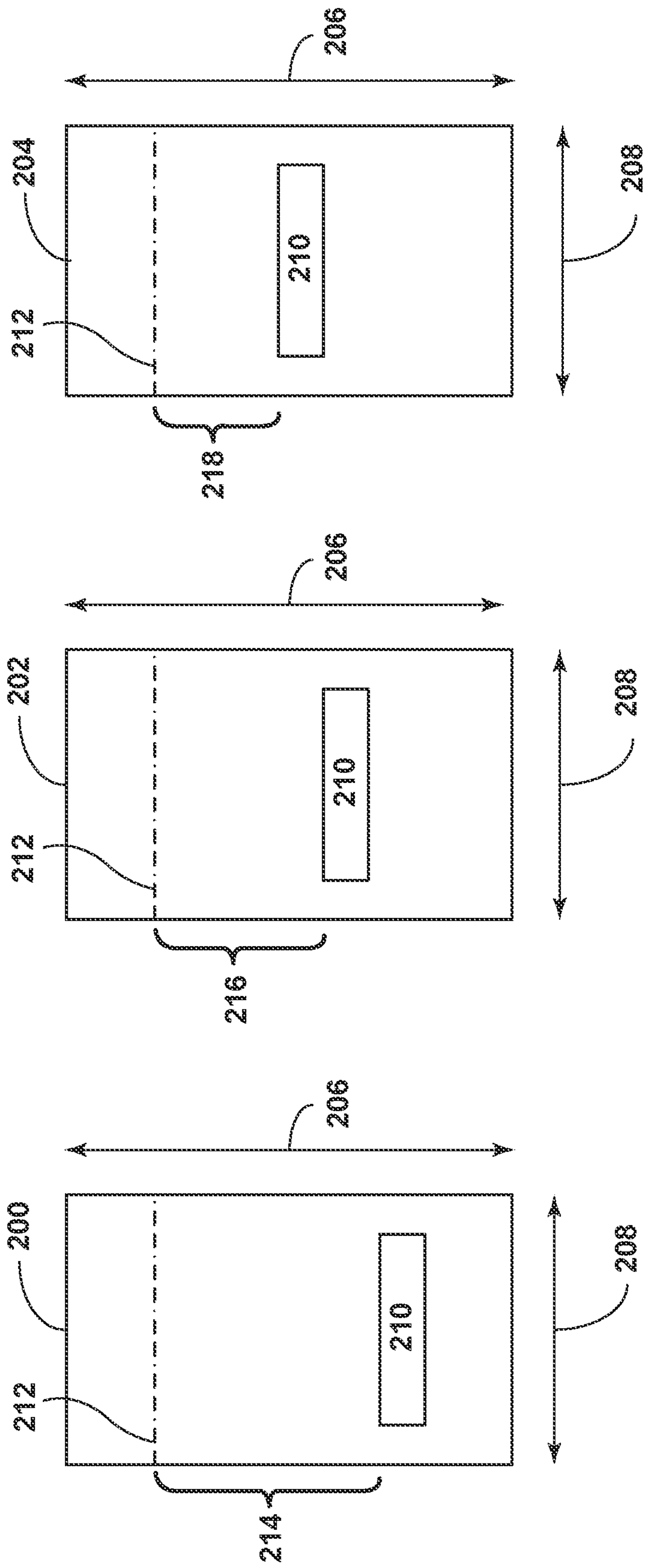
FIG. 2 illustrates three exemplary purge control inserts.

Each insert 200-204 of FIG. 2 has a length 206 and a width 208. Further, each insert incudes a window 210 that fuel vapor in intended to pass through. For illustrative purposes, an exemplary fill line 212 is also shown on each purge control insert 200-204. The exemplary fill line 212 represents a level the fuel filtering medium (e.g., activated carbon) may reach when the purge control insert 200-204 is installed in its receptacle of the housing (see, e.g., the receptacle 170 of the housing 108 of FIGS. 1B and 1C).

As shown in FIG. 2, the placement of the windows 210 in each insert 200-204 may differ. Accordingly, each insert defines a different buffer volume 214, 216, 218.

A canister (see, e.g., the canister 102 of FIGS. 1A-1C) that employs the first purge control insert 200 will cause any liquid fuel condensate from the cap (or tank assembly) to pass through more fuel vapor filtering medium than the second or third purge control inserts 202, 204, respectively. Similarly, the second purge control insert 204 will cause fuel condensate to pass through more filtering medium than the third purge control insert 204. In other words, the buffer volume 214 of the first purge control insert 200 is greater than the buffer volume 216 of the second insert 202, which in turn is greater than the buffer volume 218 (e.g., 100 cc) of the third insert 204.

The implementation of purge control insert opens up manufacturing possibilities. For example, different customers may request differing buffer volumes. In such scenarios, the same canister (e.g., the canister 102 of FIGS. 1A-1C) with the same insert receptacle (e.g., the insert receptacle of FIGS. 1B-1D) may be used for each customer, while a customer-specific purge control insert (e.g., one of the inserts 200-204 of FIG. 2) could be employed to meet the customer's buffer volume needs, thus simplifying the manufacturing process.

While not shown, each window 210 of FIG. 2 may be covered with a filtering material (e.g., a fleece) to ensure contaminants do not pass out through the purge port and eventually into an engine. Further, the amount of windows in each insert may vary. While FIG. 2 represents that each insert 200-204 includes one window 210, other examples may employ multiple windows, and/or windows of different shapes.

Figure 3:
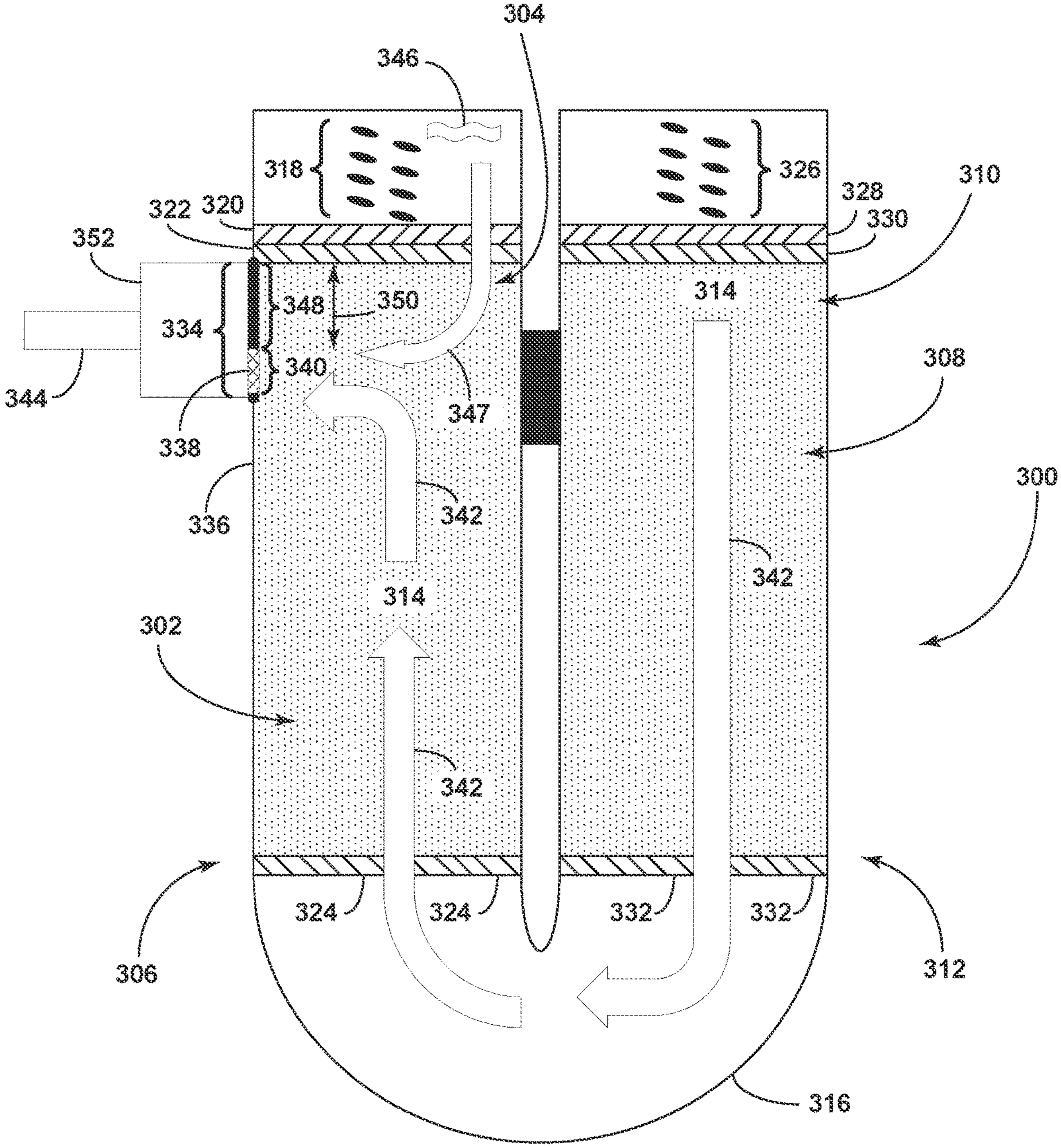
FIG. 3 illustrates a cross sectional view of a portion of another exemplary fuel canister.

Referring now to FIG. 3, a cross sectional view of an exemplary two-bed canister 300 is shown. For the sake of simplicity, the load port (e.g., the load port 106 of FIGS. 1A-1C) and the canister cap (e.g., the cap 116 of FIGS. 1A-1C) are not shown.

The canister 300 of FIG. 3 includes a first bed volume 302 having a first opening 304 and a second opening 306 opposite the first opening 304. The canister 300 also includes a second bed volume 308 having a third opening 310 and a fourth opening 312 opposite the third opening 310. Each bed volume 302, 308 is filled (or partially filled) with a fuel vapor filtering medium 314 (e.g., activated carbon). While FIG. 3 represents the fuel vapor filtering medium 314 being the same in the first bed volume 302 and in the second bed volume 308, other examples may employ differing fuel vapor filtering mediums in each volume 302, 308.

The canister 302 also includes a coupler or coupling cap 316 that fluidly couples the first bed volume 302 to the second bed volume 308. Sonic welding may for example, be employed to connect the coupler 316 to the first and second bed volumes 302, 308.

FIG. 3 further represents a first spring 318, a first permeable endcap 320, a first-end filter element (a.k.a. insert) 322, and a second-end filter element 324. The first spring 318 applies pressure to the first permeable end cap 320, that in turn applies a pressure to the first-end filtering element 322 and the filtering medium 314 within the first bed volume 302. Accordingly, the fuel filtering medium 314 in the first bed volume 302 has a relatively tight pack that minimizes voids in the filtering medium 314.

Similarly, there is a second spring 326, a second permeable end cap 328, a third-end filtering element 330, and a fourth-end filtering element 332 associated with the second bed volume 308. The second spring 326 applies pressure to the second permeable end cap 328, that in turn applies a pressure to the filtering medium 314 within the second bed volume 308, thus minimizing voids in the filtering medium 314 of the second bed volume 308.

Referring back to the first bed volume 302, a purge control insert 334 is coupled to a side wall 336 of the first bed volume 302. The purge control insert 334 includes an insert filter 338 (e.g., a fleece or foam) that covers a window 340 of the purge control insert 334. The insert filter 340 keeps the filtering medium 340 in the first bed volume 302.

Purge air 342 is represented passing through the second bed volume 308 and the first bed volume 302. The purge air 342 draws out fuel vapor from the filtering medium 314 in each bed volume 308, 302 and passes this fuel vapor out the window 340 of the purge control insert 334 so that it may pass through a purge port 344 where it may eventually be used to augment combustion.

During the flow of the purge air 342, condensed fuel 346 (i.e., fuel vapor that may have condensed in the cap or load port) may be drawn 347 into the first bed volume 302. For example, the condensed fuel vapor 346 may pass the first spring 318, through the first permeable end cap 320 and the first-end filtering element 322 and into the filtering medium 314 of the first bed volume 302. If this happens, a wall 348 of the purge control insert 334 ensures the condensed vapor 346 will pass through a buffer volume of the filtering medium 314 that is determined by a height 350 of the wall 348. If the height 350 of the wall 348 is increased, the buffer volume will increase. In contrast, if the height 350 of the wall 348 decreases, then the buffer volume decreases.

Passing the condensed vapor through the first-end filtering element 322 and a buffer volume of the filtering medium 314 minimizes the chances liquid fuel will leave the purge port 344. If some condensed vapor makes it through the window 340, a reservoir 352 may contain it so it does not pass through the purge port 344.

Figure 4:
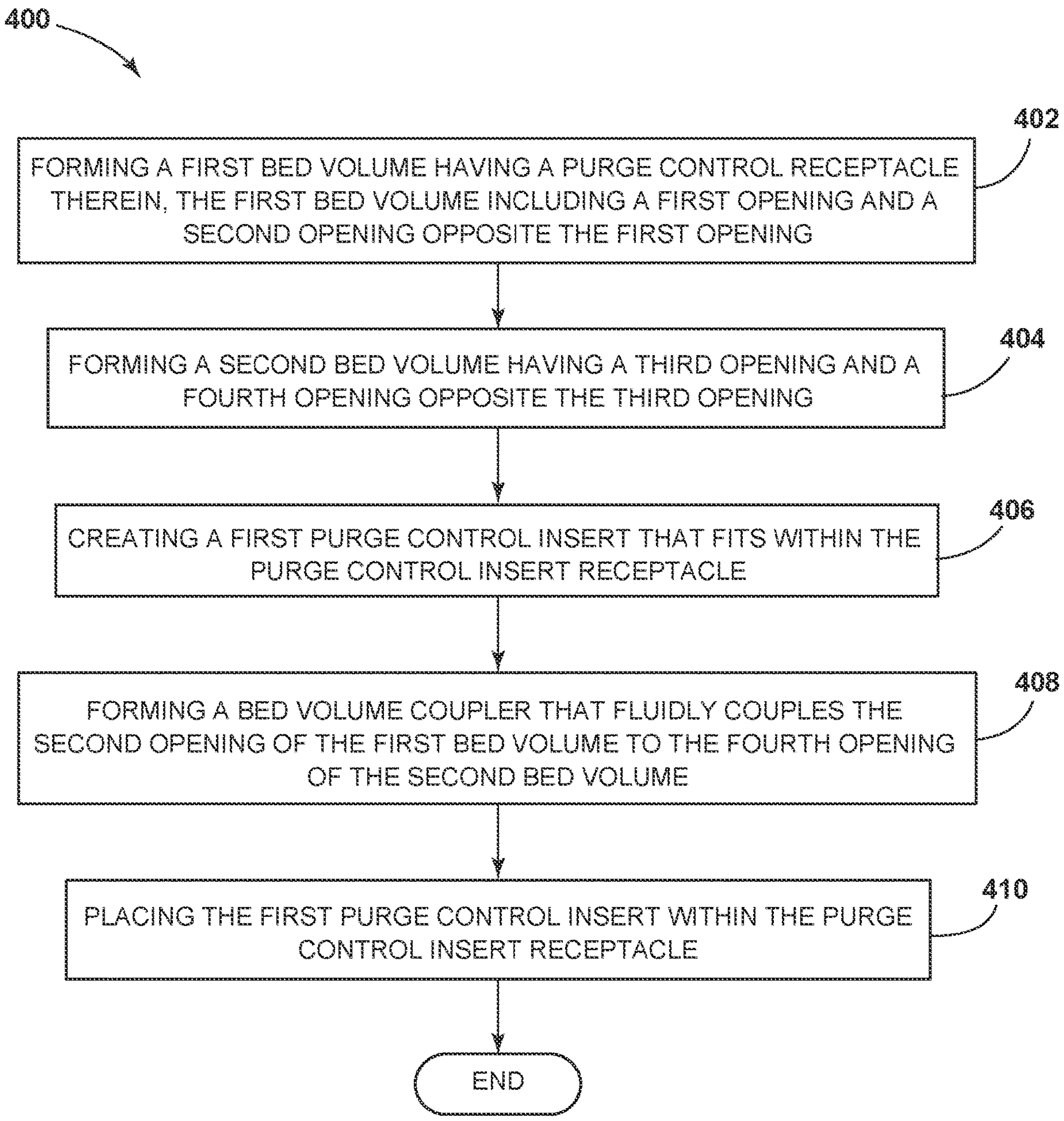
FIG. 4 illustrates an exemplary technique for manufacturing a fuel canister.

With reference now to FIG. 4, an exemplary technique 400 for manufacturing an evaporative emission control system (EVAP) canister is shown. Process control begins at block 402, where forming a first bed volume having a first opening and a second opening opposite the first opening is carried out. The first bed volume is configured to house a fuel vapor filtering medium such as, for example, activated carbon.

Forming the first bed volume includes forming a purge control receptacle on a side of the first bed volume. The purge control receptacle may be closer to the first opening than to the second opening of the first bed volume. The purge control receptacle is configured to receive a first purge control insert. The purge control insert is configured to ensure that unfiltered fuel vapor condensate drawn in during a purge cycle is drawn through a first portion (a.k.a. buffer volume) of the fuel vapor filtering medium. Further, the purge control insert is also configured to allow purge air to pass therethrough before leaving a purge port.

Technique 400 also includes forming a second bed volume having a third opening and a fourth opening opposite the third opening at block 404. The second bed volume is also configured to house the fuel vapor filtering medium. The fuel vapor filtering medium in the second bed volume need not be the same as the fuel vapor filtering medium in the first bed volume.

Forming the first and second bed volumes may be carried out via injection molding or some other molding process. For example, a housing may be molded to create the first and second bed volumes. Further, the first bed volume need not be formed before the second bed volume. Rather, the first bed volume may be formed after the second bed volume or at the same time the second bed volume is formed.

Technique 400 may also include creating the first purge control insert that fits within the purge control insert receptacle at block 406. The first purge control insert may be formed such that the purge control insert has at least one opening to allow purge air to pass therethrough before exiting the purge port. Creation or formation of the purge control insert may also include creating a wall on the purge control insert that contains the first portion of the fuel vapor filtering medium in the first bed volume and does not allow passage of the purge air, thus creating a buffer volume of filtering medium that fuel condensate may flow through.

Technique 400 may further include forming or molding a bed volume coupler that fluidly couples the second opening of the first bed volume to the fourth opening of the second bed volume at block 408. The bed volume coupler may be formed to allow the load and purge ports to be positioned on the same side of the canister housing as the bed springs, thus allowing for a compact design. Further, the bed volume coupler may be formed to include a mounting portion that may be employed to mount the fuel canister to an engine compartment.

Similar to above, the bed volume coupler need not be formed after the first or second bed volumes, but rather before or during formation of the first and/or second bed volumes.

With continued reference to FIG. 4, the exemplary technique 400 continues to block 410, where placing the first purge control insert within the purge control insert receptacle is carried out. In other examples, the purge control insert is placed within the receptacle before or when the bed volume coupler is formed.

Upon placing the purge control insert into the receptacle, the technique 400 may come to an end. Alternatively, additional steps may be carried out to complete a build of the EVAP canister.

Figure 5:
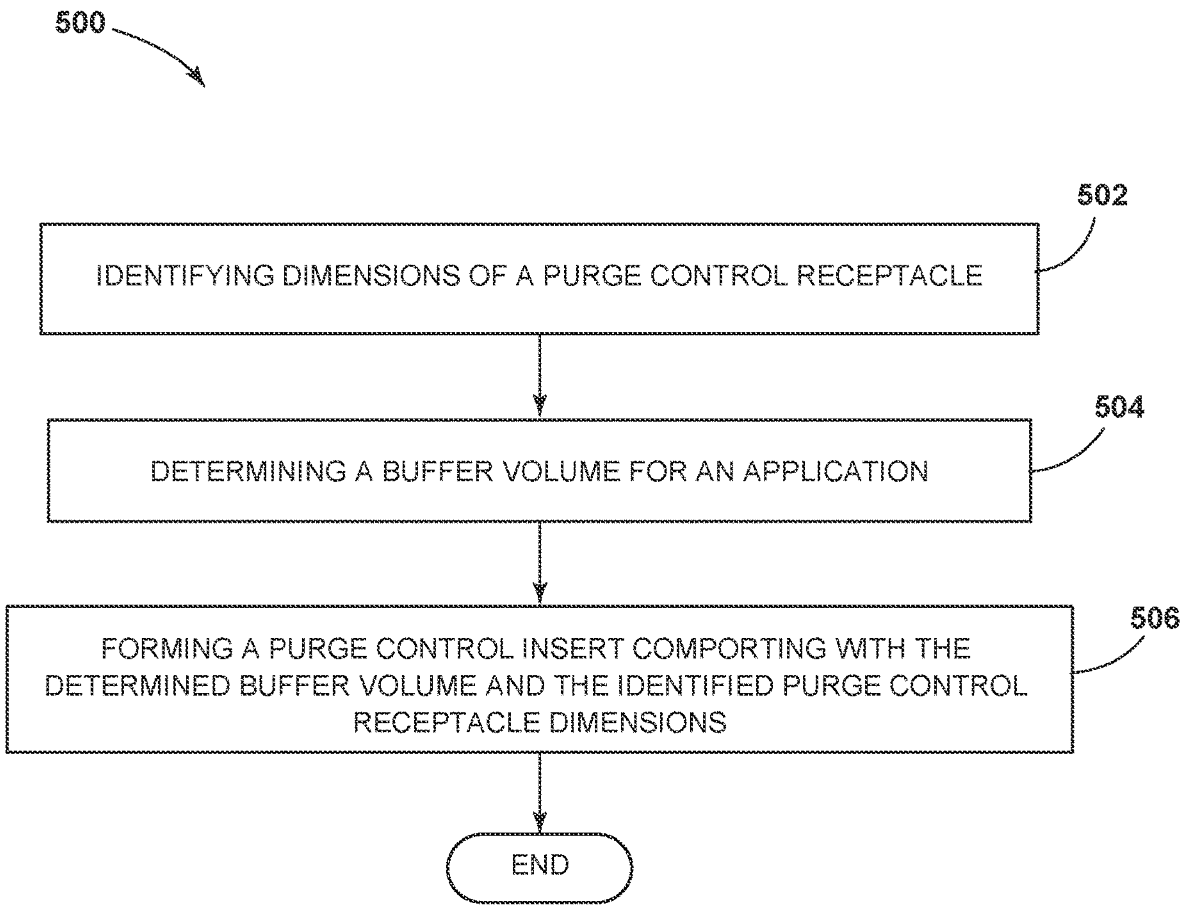
FIG. 5 illustrates an exemplary technique for manufacturing a purge control insert for a fuel canister.

Referring now to FIG. 5, an exemplary technique 500 for manufacturing a purge control insert is shown. The method includes identifying dimensions of a purge control receptacle at block 502. This may include, for example, taking measurements of a purge control receptacle in a side of a bed volume housing.

Upon identifying the dimensions of the receptable, process control proceeds to block 504, where determining a buffer volume for an application is carried out. Different clients may require different buffer volumes for their particular application. As such, the buffer volume may include receiving buffer volume characteristics from a client. It is noted that block 504 may instead be carried before block 502, or during block 502.

Once the purge control receptacle dimensions are identified and the buffer volume is determined, process control proceeds to block 506, where forming a purge control insert comporting with the determined buffer volume and the identified purge control receptacle dimensions is carried out. In other words, the purge control insert is formed to fit into the purge control insert receptacle. Further, the purge control insert is formed to meet the buffer volume requirements. This may include forming one or more windows in the insert and forming an insert wall above the windows to ensure that any fuel vapor condensate that makes its way into a filtering medium of a first bed volume during a purge cycle passes through the identified buffer volume of the filtering medium.

After forming the purge control insert, the technique 500 may come to an end.

With regard to the processes, techniques, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain examples, and should in no way be construed so as to limit the claims.

Further, when introducing elements of various embodiments of the disclosed materials, the articles “a,” “an,” “the,” and “said” are intended to mean that there are one or more of the elements. The terms “comprising,” “including,” and “having” are intended to be inclusive and mean that there may be additional elements other than the listed elements. Next, any numerical examples in the following discussion are intended to be non-limiting, and thus additional numerical values, ranges, and percentages are within the scope of the disclosed embodiments. Still further, the use of terms such as “first,” “second,” “third,” and the like that immediately precede an element(s) do not necessarily indicate sequence unless set forth otherwise, either explicitly or inferred through context.

While the preceding discussion is generally provided in the context of a material used in connection with vehicles, it should be appreciated that the present techniques are not limited to such limited contexts. The provision of examples and explanations in such a context is to facilitate explanation by providing instances of implementations and applications. The disclosed approaches may also be utilized in other contexts or configurations, such as the context of other systems that employ an internal combustion engine that may not be a vehicle.

While the disclosed materials have been described in detail in connection with only a limited number of embodiments, it should be readily understood that the embodiments are not limited to such disclosed embodiments. Rather, that disclosed can be modified to incorporate any number of variations, alterations, substitutions or equivalent arrangements not heretofore described, but which are commensurate with the spirit and scope of the disclosed materials. Additionally, while various embodiments have been described, it is to be understood that disclosed aspects may include only some of the described embodiments. Accordingly, that disclosed is not to be seen as limited by the foregoing description, but is only limited by the scope of the appended claims.

What is claimed is:

1. An evaporative emission control system (EVAP) canister comprising:

a first bed volume in a housing, the first bed volume having a side wall, a first opening, and a second opening opposite the first opening, wherein the side wall is between the first opening and the second opening;

a second bed volume in the housing, the second bed volume having a third opening and a fourth opening opposite the third opening, wherein at least a portion of the first bed volume and the second bed volume are configured to house a fuel vapor filtering medium;

a load port configured to allow fuel vapor from a fuel tank into the first bed volume;

a purge control receptacle that forms a receptacle opening through the side wall of the first bed volume so that purge air can exit the first bed volume via the receptacle opening, the purge control receptacle is closer to the first opening than to the second opening of the first bed volume, the purge control receptacle is configured to receive a first purge control insert so that the purge air exiting through the receptacle opening exits through the purge control insert; and a purge port fluidly coupled to the first bed volume via the receptacle opening through the side wall of the first bed volume, wherein the purge port is configured to convey the purge air exiting the receptacle opening outside the EVAP canister.

2. The EVAP canister of claim 1 wherein the purge control receptacle is configured so that when the first purge control insert is coupled thereto, unfiltered fuel vapor condensate drawn in during a purge cycle is passed into a first portion of the fuel vapor filtering medium in the first bed volume, and wherein the purge control receptacle is further configured to receive a second purge control insert when the first purge control insert is not employed so that the unfiltered fuel vapor condensate that may be drawn in during the purge cycle is passed into a second portion of the fuel vapor filtering medium in the first bed volume, and wherein the first portion of the fuel vapor filtering medium has a volume different than the second portion of the fuel vapor filtering medium.

3. The EVAP canister of claim 1 wherein the EVAP canister is configured to i) enable a load cycle that allows the fuel vapor from the fuel tank to pass through the fuel vapor filtering medium in the first bed volume before passing into the fuel vapor filtering medium of the second bed volume and ii) enable the purge cycle such that purge air is passed through the second bed volume before passing through the first bed volume, and wherein the purge control receptacle is further configured so that at least a portion of the first purge control insert is embedded in the fuel vapor filtering medium when coupled to the purge control receptacle and when the first bed volume houses the fuel vapor filtering medium.

4. The EVAP canister of claim 1 further comprises the fuel vapor filtering medium, wherein the fuel vapor filtering medium in the first bed volume is a first type and the fuel vapor filtering medium in the second bed volume is a second type different than the first type, and wherein the first type and the second type each include activated carbon.

5. The EVAP canister of claim 1 further comprising a pass-through coupler that fluidly connects the second opening of the first bed volume to the third opening of the second bed volume.

6. The EVAP canister of claim 5 wherein the pass-through coupler includes a mounting portion configured to at least partially secure the housing within a vehicle.

7. An evaporative emission control system (EVAP) comprising:

a first bed volume in a housing, the first bed volume having a side wall, a first opening, and a second opening opposite the first opening, wherein the side wall extends from the first opening to the second opening;

a second bed volume in the housing, the second bed volume having a third opening and a fourth opening opposite the third opening, wherein the first and second bed volumes are configured to house a fuel vapor filtering medium;

a load port configured to convey unfiltered fuel vapor from a fuel tank into the first opening of the first bed volume;

a purge control receptacle through the side wall of the first bed volume, the purge control receptacle is configured to receive a first purge control insert so that at least a portion of the first purge control insert is embedded in the fuel vapor filtering medium in the first bed volume when the first purge control insert is coupled to the purge control receptacle, wherein the purge control receptacle ensures that, during a purge cycle, any fuel vapor condensate that is drawn through the first opening of the first bed volume passes into a first portion of the fuel vapor filtering medium in the first bed volume when the first purge control insert is coupled to the purge control receptacle and the first bed volume houses the fuel vapor filtering medium; and a purge port fluidly coupled to the side wall so that, during a purge cycle, purge air exiting through the side wall via the first purge control insert passes through the purge port protruding from the housing.

8. The EVAP of claim 7 wherein the purge control receptacle is further configured to receive a second purge control insert when the first purge control insert is not employed, wherein the purge control receptacle is configured so that the unfiltered fuel vapor condensate that may be drawn in during the purge cycle is passed into a second portion of the fuel vapor filtering medium in the first bed volume when the second purge control insert is employed, and wherein the first portion of the fuel vapor filtering medium has a volume different than the second portion of the fuel vapor filtering medium.

9. The EVAP of claim 7 further comprising a reservoir between the purge port and the side wall, wherein the reservoir is configured to capture any fuel vapor condensate that may pass through the side wall via the first purge control insert during the purge cycle so that it does not exit the purge port, wherein the purge port is fluidly coupled to the side wall via the reservoir.

10. The EVAP of claim 7 further comprising the first purge control insert, wherein the first purge control insert comprises a wall having a wall height, wherein the wall height determines the first portion of the fuel vapor filtering medium that the fuel vapor condensate will pass through after the purge air is drawn through the first opening.

11. The EVAP of claim 7 wherein the load port protrudes in substantially a same direction as the purge port.

12. The EVAP of claim 7 further comprising a coupler that fluidly connects the second opening of the first bed volume to the third opening of the second bed volume, wherein the EVAP is configured to i) enable a load cycle that allows fuel vapor from the fuel tank to pass through the fuel vapor filtering medium in the first bed volume before passing into the fuel vapor filtering medium of the second bed volume during the load cycle and ii) enable the purge cycle such that purge air is passed through the second bed volume before passing through the first bed volume and out through the at least one window in the first purge control insert.

13. The EVAP of claim 12 wherein the coupler includes a mounting portion configured to enable mounting of the housing to a vehicle.

14. A method of manufacturing an evaporative emission control system (EVAP) canister comprising:

forming a first bed volume having a first opening and a second opening opposite the first opening, the first bed volume is configured to house a fuel vapor filtering medium, wherein forming the first bed volume includes forming a purge control receptacle on a side wall of the first bed volume between the first opening and the second opening so that purge air exits the first bed volume through the side wall via the purge control receptacle, the purge control receptacle is configured to be couplable to a first purge control insert so that the purge air that exits via the purge control receptacle does so via the purge control insert when coupled thereto, wherein the purge control receptacle is configured to ensure that at least a portion of the first purge control insert is embedded in the fuel vapor filtering medium in the first bed volume when the first purge control insert is coupled to the purge control receptacle and when the fuel vapor filtering medium is housed in the first bed volume;

forming a second bed volume fluidly connected to the first bed volume, the second bed volume having a third opening and a fourth opening opposite the third opening, the second bed volume is also configured to house the fuel vapor filtering medium; and forming a purge port outside the first bed volume so that the purge air that exits through the purge control receptacle passes through the purge port after passing through the purge control receptacle.

15. The method of claim 14 further comprising adding the fuel vapor filtering medium to the first bed volume and the second bed volume, wherein the first bed volume is configured to house the fuel vapor filtering medium that is a first type of activated carbon, and wherein the second bed volume is configured to house the fuel vapor filtering medium that is a second type of activated carbon different than the first type of activated carbon, and wherein the purge control receptacle on the side wall of the first bed volume is further configured to receive any individual purge control insert from a plurality of different purge control inserts, wherein each insert of the plurality of different purge control inserts is configured to ensure that fuel vapor condensate drawn into the first opening during the purge cycle passes through a different portion of the fuel vapor filtering medium.

16. The method of claim 14 wherein forming the first bed volume and the second bed volume comprises molding a housing that defines the first bed volume and the second bed volume.

17. The method of claim 14 further comprising forming a bed volume coupler that fluidly couples the second opening of the first bed volume to the fourth opening of the second bed volume.

18. The method of claim 17 wherein forming the bed volume coupler comprises forming a canister mounting component on the bed volume coupler, wherein the canister mounting component enables mounting of the housing to a vehicle.

19. The method of claim 14 further comprising creating the first purge control insert such that the first purge control insert has at least one opening to allow, when the first purge control insert is coupled to the side wall via the purge control receptacle, the purge air to pass therethrough before exiting the purge port.

20. The method of claim 19 wherein creating the first purge control insert comprises creating a wall on the first purge control insert that contains the first portion of the fuel vapor filtering medium in the first bed volume and does not allow passage of the purge air.

* * * * *